United States Patent
Peterson et al.

(10) Patent No.: US 6,594,682 B2
(45) Date of Patent: Jul. 15, 2003

(54) CLIENT-SIDE SYSTEM FOR SCHEDULING DELIVERY OF WEB CONTENT AND LOCALLY MANAGING THE WEB CONTENT

(75) Inventors: Leonard J. Peterson, Woodinville, WA (US); Steven J. Freedman, Seattle, WA (US); Hadi Partovi, Seattle, WA (US); Raymond E. Endres, Kirkland, WA (US); David J. D'Souza, Kirkland, WA (US); Erik Castedo Ellerman, Redmond, WA (US); Julian P. Jiggins, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 08/959,613

(22) Filed: Oct. 28, 1997

(65) Prior Publication Data

US 2001/0003828 A1 Jun. 14, 2001

(51) Int. Cl.[7] .............................................. G06F 15/16
(52) U.S. Cl. ...................... 709/102; 709/219; 709/232
(58) Field of Search .................................. 709/277, 228, 709/229, 232, 233, 243, 202, 203, 102, 200, 217, 218, 234; 713/600

(56) References Cited

U.S. PATENT DOCUMENTS

| | | | |
|---|---|---|---|
| 5,715,443 A | * | 2/1998 | Yanagibara et al. |
| 5,754,939 A | * | 5/1998 | Herz et al. .................. 455/4.2 |
| 5,758,257 A | * | 5/1998 | Herz et al. |
| 5,760,771 A | * | 6/1998 | Blonder et al. |
| 5,768,528 A | * | 6/1998 | Stumm .................. 395/200.61 |
| 5,778,187 A | * | 7/1998 | Monteiro et al. |
| 5,790,790 A | * | 8/1998 | Smith et al. |
| 5,832,223 A | * | 11/1998 | Hara et al. .............. 395/200.47 |
| 5,832,232 A | * | 11/1998 | Danneels |
| 5,832,496 A | * | 11/1998 | Anand et al. |

(List continued on next page.)

OTHER PUBLICATIONS

Yahoo, "Internet Search Engine", http://www.yahoo.com, 2 pages. Printed May 10, 2002.
Lycos, "Internet Search Engine", http://www.lycos.com, 1 page. Printed May 10, 2002.

(List continued on next page.)

*Primary Examiner*—Le Hien Luu
*Assistant Examiner*—Stephan Willett
(74) *Attorney, Agent, or Firm*—Lee & Hayes, PLLC

(57) ABSTRACT

A client-based system has a scheduling subsystem to schedule a time to obtain the Web content from the server. When the client reaches the scheduled time, the scheduling subsystem generates an event notification that contains sufficient information explaining how to retrieve the Web content. The client-based system has a delivery subsystem that is responsive to the event notification to obtain the Web content at the time set by the scheduling subsystem. The delivery subsystem preferably has multiple delivery modules that enable different types of distribution mechanism. In addition to the Web content or data itself, the delivery subsystem obtains an index to the Web content. The index summarizes the Web content to facilitate local search and find tasks. The index and Web content are stored in a cache at the client. An indexing subsystem presents the index to a user and enables the user to select from the index portions of the Web content that they prefer. Based on these preferences, filters are created to remove items not of interest. When the client is offline, the user browses the cached Web content. The user is offered essentially the same functionality as a live online session, except that any requests to a remote server are temporarily accumulated for later submission. When the client reconnects to the server, all accumulated data is sent in batch to the appropriate servers. The user can also create his/her own channel by aggregating content from different channels.

26 Claims, 9 Drawing Sheets

U.S. PATENT DOCUMENTS

| | | | | |
|---|---|---|---|---|
| 5,848,396 | A | * | 12/1998 | Gerace |
| 5,854,901 | A | * | 12/1998 | Cole et al. |
| 5,870,558 | A | * | 2/1999 | Branton, Jr. et al. |
| 5,907,681 | A | * | 5/1999 | Bates et al. ............... 709/228 |
| 5,961,602 | A | * | 10/1999 | Thompson et al. ......... 709/229 |
| 5,978,381 | A | * | 11/1999 | Perlman et al. |
| 5,978,842 | A | * | 11/1999 | Noble et al. |
| 5,991,306 | A | * | 11/1999 | Burns et al. |
| 5,999,664 | A | * | 12/1999 | Mahoney et al. |
| 6,065,059 | A | * | 5/2000 | Shieh et al. ............... 709/233 |
| 6,134,584 | A | * | 10/2000 | Chang et al. |
| 6,182,113 | B1 | * | 1/2001 | Narayanaswami ......... 709/203 |
| 6,275,496 | B1 | * | 8/2001 | Burns et al. ............... 709/217 |
| 6,298,373 | B1 | * | 10/2001 | Burns et al. ............... 709/203 |
| 6,324,182 | B1 | * | 11/2001 | Burns et al. |
| 6,442,598 | B1 | * | 8/2002 | Wright et al. ............. 709/217 |
| 2001/0003828 | A1 | * | 6/2001 | Peterson et al. ........... 709/219 |

OTHER PUBLICATIONS

Google, "Internet Search Engine", http://www.google.com, 1 page. Printed May 10, 2002.

Altavista, "Internet Search Engine", http://alta–vista.com, 1 page. Printed May 10, 2002.

GO.com, "Internet Search Engine", http://infoseek.go.com, 2 pages. Printed May 10, 2002.

* cited by examiner

CLIENT-SIDE SYSTEM FOR SCHEDULING DELIVERY OF WEB CONTENT AND LOCALLY MANAGING THE WEB CONTENT

TECHNICAL FIELD

This invention relates to client-server systems and methods for obtaining Web related content from one or more servers and presenting that content to a user. More particularly, this invention further relates to client-side software and devices that facilitate delivery and presentation of the Web content.

BACKGROUND OF THE INVENTION

Public networks, and most notably the Internet, are emerging as a primary conduit for communications, entertainment, and business services. The Internet is a network formed by the cooperative interconnection of computing networks, including local and wide area networks. It interconnects computers from around the world with existing and even incompatible technologies by employing common protocols that smoothly integrate the individual and diverse components.

The Internet has recently been popularized by the overwhelming and rapid success of the World Wide Web (WWW or Web). The Web links together various topics in a complex, non-sequential web of associations which permit a user to browse from one topic to another, regardless of the presented order of topics. The Web is rapidly evolving as a standard for distributing, finding, and accessing information of any type. A "Web browser" is an application that executes on the user's computer to navigate the Web. The Web browser allows a user to retrieve and render hypermedia content from the WWW, including text, sound, images, video, and other data.

The amazing growth rate in the demand for data over the Internet is partly due to an increasing audience. The World Wide Web has crossed the threshold that makes it affordable and interesting to a much larger audience. There is information available on a very wide variety of topics, and tools exist to help people find and view the information cost effectively.

Another factor fueling the Internet growth is the exploding amount of information that is now available on the Web. The Web has grown from thousands of Web sites to several million Web sites in a very short period of time. The growth continues at an exponential rate. Many corporations and libraries are translating paper and microfilm information archives to electronic media that is published via the Web or similar network. While this has resulted in a wealth of information that is now available to virtually anyone, the information is poorly organized and the sheer volume of the information makes it hard for a typical person to sort through, find, and retrieve specific information.

The shift from paper published media to online media also created a new problem. People wishing to access Web information are limited to accessing it only when connected to the Internet or other network. Network connectivity is largely restricted to a physical wire connection to the computer, or a virtual connection to wireless transmission networks. This makes it hard, if not impossible, to disconnect the computer from the network and still access information.

As more information is brought online, the demand on the computational and network resources to categorize, search, personalize, and retrieve the information is placing new demands on the existing client-server infrastructure that makes up networks like the Web. Additionally, the data demands are affected by a trend for Web sites to evolve from serving pure text to serving richer media content, including graphics, sound, and video. Adding richer media content is popular because it presents information more clearly and attractively, thereby enhancing a site's impact and popularity.

Due to these emerging factors, a significant problem facing the continued growth and acceptance of the Internet is that conventional methods for accessing the Web do not scale well to meet the rapid growth in supply and demand, or to satisfy the need for better organization. The quality of service for the Web is intuitively measured by the user as the amount of time it takes to search, find, request, and receive data from the Web. Internet users have been conditioned through their experiences with television and standalone multimedia applications to expect instantaneous results on demand. Users are accustomed to changing the TV channel and instantaneously viewing the video content for that channel on the screen. Unfortunately, the Internet is unable to deliver data instantaneously. For the most part, the Internet has significant latency problems that reduce fairly routine Web browsing exercises to protracted lessons in patience.

The basic dilemma is that the quality of service degrades as more people try to use the Web. More unsettling is the corollary that service for popular Web sites is typically much worse than service for unpopular sites. There are several causes of the service problem, including overburdened servers and slow distribution networks.

Networks often have too little bandwidth to adequately distribute the data. "Bandwidth" is the amount of data that can be moved through a particular network segment at any one time. The Internet is a conglomerate of different technologies with different associated bandwidths. Distribution over the Internet is usually constrained by the segment with the lowest available bandwidth.

In the consumer market, for example, most clients typically connect to the Internet via a local modem connection to an Internet Service Provider (ISP). This connection is generally enable a maximum data rate of 14.4 Kbps (Kilobits per second) to 28.8 Kbps. Some clients might employ an ISDN connection, which facilitates data flow in the range of 128–132 Kbps.

The ISP connects to the primary distribution network using a higher bandwidth pipeline, such as a T1 connection that can facilitate a maximum data flow of approximately 1.5 Mbps. This bandwidth is available to serve all of the clients of the ISP so that each client can consume a 14.4 Kbps, 28.8 Kbps, or 128 Kbps slice of the 1.5 Mbps bandwidth. As more clients utilize the ISP services, however, there is less available bandwidth to satisfy the subscriber requests. If too many requests are received, the ISP becomes overburdened and is not able to adequately service the requests in a timely manner, causing frustration to the users.

Couple this problem with the fact that clients typically go underutilized. While servers are pushed to their maximum output limits, clients often sit idle for many hours per day.

Because the bandwidth issue is constrained by technology development in the physical network architecture, early attempts to solve these problems focused on organizing the Web content in some manner to better facilitate search and retrieval. This in turn enabled users to more quickly access information on the Internet, even though the underlying physical architecture remained the same.

The earliest solutions involve organizing the information by hand. Humans review information by browsing the Internet and assemble large lists of documents containing similar information. The lists are further organized into hierarchies of categorized content. People can view the categorized lists online in an attempt to more quickly obtain a specific piece of information. The advantage of this scheme is that human reviewers are very good at categorizing the information and discarding low-value documents, so the lists of categorized information contain fairly high value information. Some hand-categorized data schemes are organized into popular Web sites. The best known example of this is the "Yahoo!" Web site.

The disadvantage of this human-driven technique is that it becomes more difficult to keep up when the amount of information grows exponentially. The categorized lists are frequently out of date or inadequate. Additionally, the method requires a user to be connected to the network to view the information.

Another approach is to use massive search engines that automatically retrieve documents on the Web and attempt to index all of the information. The technique of fetching this information is known as "web-crawling" or "web-scraping". Heuristic document categorization algorithms index the information and store the indices (but not the information) in large centralized databases. Users run queries against the massive databases to find specific information, and then retrieve the information from individual web-sites. Popular examples of these types of Web based services include Lycos, InfoSeek, Alta-Vista, and others. They are generally referred to as "Search Sites" or "Internet Search Engines".

The advantage of web-crawling and indexing is that computers can automate the process of retrieving and reviewing documents. The speed of computers means that a larger number of documents can be compiled as compared to human efforts. The disadvantage is that the computers have a hard time distinguishing between valuable information and worthless information, and are not very good at categorizing the information. Also, these types of databases are centralized and require an end user to be online to make queries against the database. A third approach to solving the information glut problem is to employ information services that collect and editorialize information that they deem as important. The information is indexed and placed into a centralized database. The services utilize a combination of humans to collect and categorize information, and computers to perform automated information collection. Because these systems effectively filter down the amount of potential information by many orders of magnitude, it is possible to locally store portions of the centralized database on the client server and for the user to view the information when disconnected.

The most popular example of this type of system is PointCast. PointCast collects news articles from many sources, edits them down to a predefined maximum length, categorizes them, and stores them in a centralized database at their data center. Client software then queries the centralized database to obtain the portions of the data in which the user is interested.

The disadvantage of these systems is that a centralized database scales poorly as more and more users attempt to retrieve information. By centralizing all information, the data source becomes a choker point to information flow. Another disadvantage is that while some of these centralized information services provide a good selection of information for users, the information is dramatically more restricted in comparison to the vast wealth of information available on the Web. Users are restricted to these service-selected information categories.

Accordingly, there remains a need to develop improved techniques for facilitating distribution of Web content over the Internet.

SUMMARY OF THE INVENTION

This invention concerns a client-based system that improves gathering and organizing of Web content in a manner that mitigates impact on overburdened servers and slow networks. The client-based system enables personalized filtering to collect only that content which the individual user prefers, while rejecting unwanted content. Moreover, the system enables the user to work offline from the server with similar functionality to online operation.

According to one aspect of this invention, the client-based system has a scheduling subsystem to schedule a time to obtain the Web content from the server. When the client reaches the scheduled time, the scheduling subsystem generates an event notification that contains sufficient information explaining how to retrieve the Web content. As an example, the event notification might contain a URL (universal resource locator) that the client uses to go out and fetch the Web content. The event notification might alternatively contain a reference to a multicast address or a broadcast transmission frequency to which the client listens or tunes to retrieve the desired Web content.

The client-based system has a delivery subsystem that is responsive to the event notification to facilitate retrieval of the Web content at the time set by the scheduling subsystem. The delivery subsystem preferably has multiple delivery modules that enable delivery of the content over different types of distribution systems. For instance, the delivery subsystem might comprise a multicast listener to listen to a multicast address for the Web content, or a fetching program that goes out to the server and retrieves the Web content over the Internet, or a broadcast packet rebuilder that reconstructs Web content that is broadcast over a wireless network.

In addition to the Web content or data itself, the delivery subsystem obtains an index to the Web content. The index summarizes the Web content to facilitate local search and find tasks. The index and Web content are stored in a cache at the client, preferably according to some unique identifier such as URLs.

The client-based system also has an indexing subsystem to retrieve the index from the cache and present the index to a user. The indexing subsystem supports a user interface, such as a graphical windowing UI, which enables the user to select from the index portions of the Web content stored in the cache.

According to an aspect of this invention, the user can create personal filters that filter the index to remove items not of interest. The filters can condense the index when it is received prior to be cached, or when the user attempts to view the index.

According to another aspect of this invention, the user can continue to search and find the Web content using the index even though the client is offline from the server. The user is given essentially the same functionality as a live online session, except that requests to remote servers are temporarily accumulated for later submission. For example, the user may fill out an HTML (hypertext markup language) form and click a "submit" button to send the completed form back to the originating Web site. To the user, the clicking action appears to send the form back to the server. However, since the client is offline, the HTML form is kept in the cache until a later online session. When the client subsequently reconnects to the server, all accumulated data (i.e., requests, forms, etc.) that is destined for one or more remote servers is sent in batch to the appropriate servers.

According to another aspect, the user can create his/her own channel. The client-based system enables the user to select preferred Web content that is delivered using different channels. For instance, the user might like to see all basketball-related content. Based on the user's selections, the system constructs a set of filtration rules and filters the different channels according to the filtration rules to aggregate the preferred Web content. In this manner, the system might extract basketball scores from one Web site, player statistics from another, and upcoming schedules from a third. The client-based system then presents the aggregated Web content as a new channel to a user, such as the "Basketball" channel.

In one implementation, the client-based system is built into a Web browser. The browser may be integrated into the operating system, or run as a separate application.

BRIEF DESCRIPTION OF THE DRAWINGS

The same reference numbers are used throughout the drawings to reference like components and features.

FIG. 3 shows the client-based system implemented in a browser.

DETAILED DESCRIPTION

Figure 1:
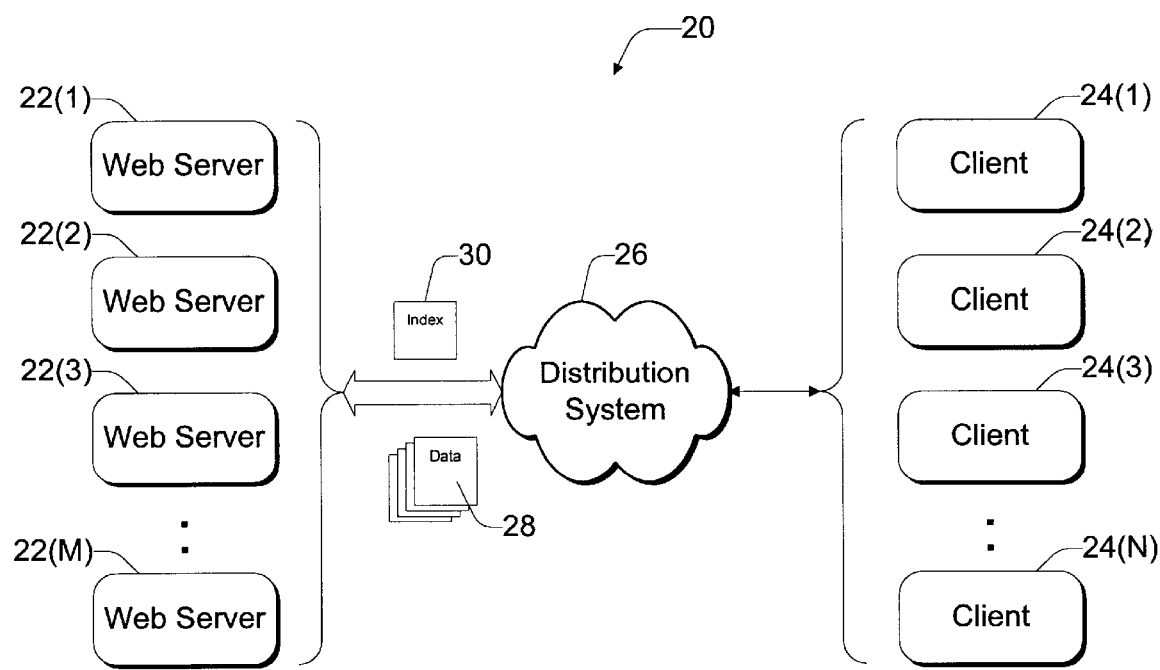
FIG. 1 is a diagrammatic illustration of a client-server system.

FIG. 1 shows a client-server system 20 having multiple Web servers 22(1)–22(M) coupled to serve Web content to multiple clients 24(1)–24(N) via a distribution system 26. The Web content can come in many different forms. One example is a Web page stored at a Web site. A Web page is a title, collection of information, and pointers or "hyperlinks" to other information. A Web page may be constructed from various types of content including computer data, audio, video, animation, bit maps or other graphics, applications or other executable code, text, hypermedia, or other multimedia types. Another example of Web content is a video or audio that can be played at the server and transmitted over a distribution system 26 to one or more clients.

Distribution system 26 represents many different types of distribution systems. As an example, the distribution system 26 might represent the Internet, or an Intranet, or other network. Such networks enable point-to-point communication, one-to-many communication, and many-to-many communication. The Internet, for example, supports multicast transmissions in which one or more servers transmit content to a predefined address. Clients listen to the address to receive the multicast content. In addition, such network systems (excepting perhaps multicast) are typically characterized as bi-directional, allowing communication both from the server to the client, and return communication from the client back to the server.

The distribution system 26 might also represent a broadcast transmission system in which Web content is distributed over a broadcast medium, such as radio, TV, microwave, satellite, or the like. A broadcast distribution system supports one-to-many communication and is generally characterized as a unidirectional system. Multicast is usually likened to a broadcast system as being unidirectional.

According to an aspect of this invention, the Web servers provide both the Web content 28 and an index 30 to the Web content. The index 30 contains information about the Web content 28. The index 30 also provides a way to locate the actual Web content, such as specifying a URL or a channel for each piece of Web content that is listed. The index 30 includes descriptive information about each item of content, such as title, author, summary, last time modified, etc. This descriptive information can be used to categorize the Web content.

The client-server system 20 supports a two-phase delivery, regardless of which type of distribution system is employed. The first phase is to deliver the index 30. The index may originate from one server, or it may be a collection of elements originating from multiple servers. The index can then be used to identify the Web content 28 to be delivered to the client. The second phase is to deliver the Web content 28. The Web content may originate from one server, or from multiple servers. Moreover, the index and Web content may originate from the same server or from separate servers.

The distribution system 26 supports different transfer architectures. The delivery of the index 30 and the Web content 28 can involve one or more of the following architectures: a "pull-based" architecture, a "poll-based" architecture, and a "push-based" architecture. In a pull-based architecture, the user directly or indirectly instructs the client software to initiate a request for data from the server. HTTP (hyptertext transfer protocol) and FTP (file transfer protocol) are examples of a "pull-based" architecture.

In a poll-based architecture, the client software "pulls" the data on a periodic basis, not directly initiated by a user action. This may be based on a fixed repeating schedule, or a repeating schedule with a random element. Polling HTTP is an example of a "poll-based" architecture.

In a push-based architecture, the server initiates data transfer to the client software. Multicast protocols, wireless pagers, radio, and TV are examples of "push-based" architecture. To the casual user, "poll" and "push" can be made to appear the same.

The client-server system 20 employs a channel metaphor to generally describe how the Web content 28 and index 30 are made available to the user. For instance, news-related Web content might be available on a news channel and sports content might be available on the sports channel. In some instances, the channel is associated with a particular source, such as a CNN channel that facilitates delivery of CNN news from the CNN Web site. However, the term "channel" is not restricted to a single source, or to a single transport mechanism, or to a single protocol.

More broadly-speaking, a "channel" is an organizational tool that defines how content is bundled for presentation to the user. From the user perspective, the channel defines a content class, even though the content may be the aggregation of data from many different sources.

As possible examples, a channel might represent the content that is available from a single Web site, such as a channel for the popular Web site "ESPN SportsZone". The channel might alternatively consist of a group of like content that the user personally assembles and which is gathered from multiple sources. For instance, the user might create a "Basketball" channel that collects and presents basketball-related content from various sources like ESPN, CNN, MSNBC, and the like.

The channel might further represent a physical transport, such as a channel associated with a multicast address or a channel associated with a particular airwave frequency. In this regard, the term channel is akin to the familiar TV-notion of channel. But, the term "channel" is not restricted nor necessarily tied to the underlying transport mechanism and hence is more general than the traditional TV channel.

Exemplary Client Configuration

Figure 2:
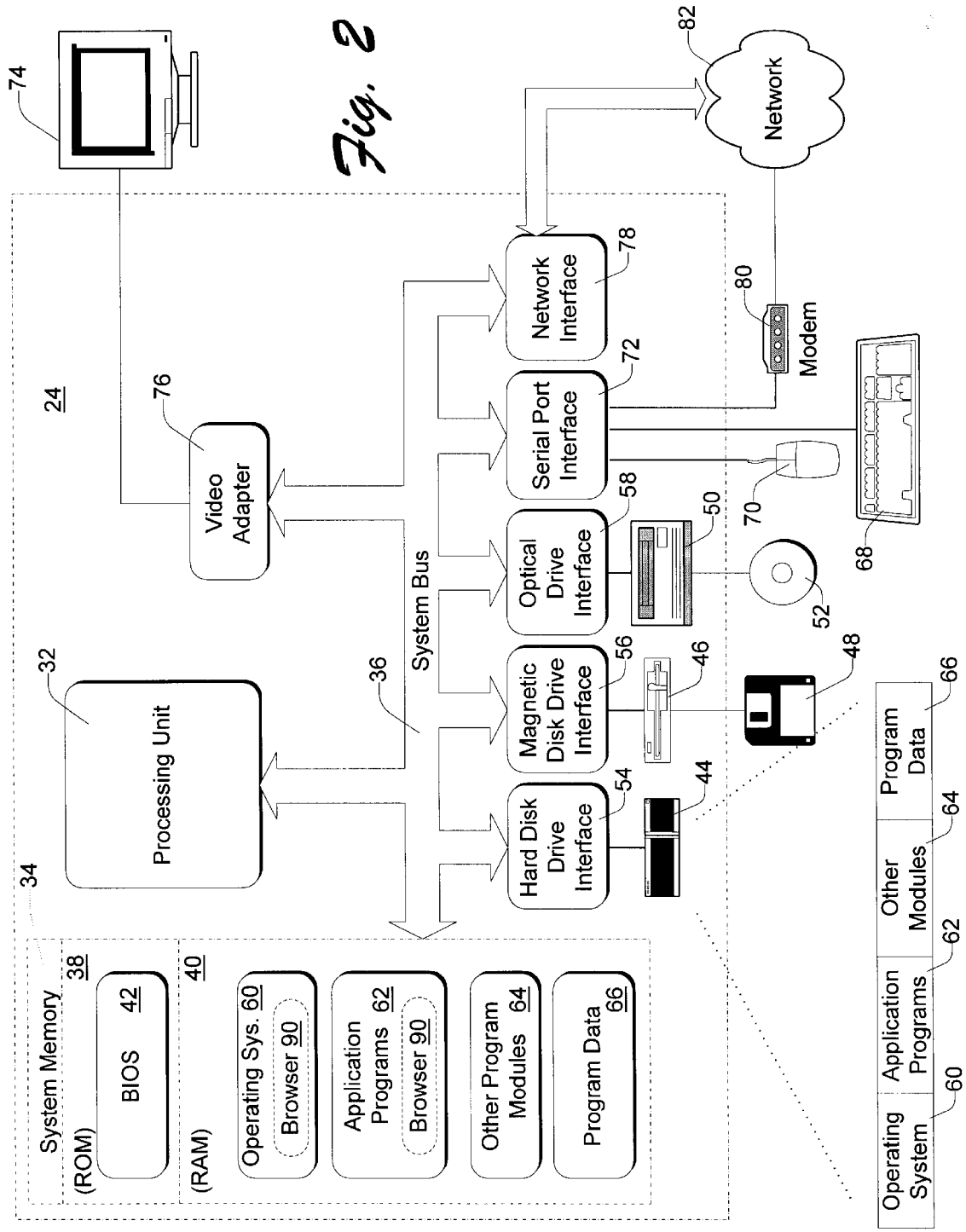
FIG. 2 is a block diagram of a client computer.

FIG. 2 shows an example implementation of the client computer, referenced generally as number 24. The client is illustrated as being implemented as a general-purpose computer. The client 24 includes a processing unit 32, a system memory 34, and a system bus 36 that interconnects various system components, including the system memory 34 to the processing unit 32. The system bus 36 may be implemented as any one of several bus structures and using any of a variety of bus architectures, including a memory bus or memory controller, a peripheral bus, and a local bus.

The system memory 34 includes read only memory (ROM) 38 and random access memory (RAM) 40. A basic input/output system 42 (BIOS) is stored in ROM 38.

The client 24 has one or more of the following drives: a hard disk drive 44 for reading from and writing to a hard disk or hard disk array, a magnetic disk drive 46 for reading from or writing to a removable magnetic disk 48, and an optical disk drive 50 for reading from or writing to a removable optical disk 52 such as a CD ROM or other optical media. The hard disk drive 44, magnetic disk drive 46, and optical disk drive 50 are connected to the system bus 36 by a hard disk drive interface 54, a magnetic disk drive interface 56, and an optical drive interface 58, respectively. The drives and their associated computer-readable media provide nonvolatile storage of computer readable instructions, data structures, program modules and other data for the client 24.

Although a hard disk, a removable magnetic disk 48, and a removable optical disk 52 are described, other types of computer readable media can be used to store data. Other such media include magnetic cassettes, flash memory cards, digital video disks, Bernoulli cartridges, random access memories (RAMs), read only memories (ROM), and the like.

A number of program modules may be stored on the hard disk, magnetic disk 48, optical disk 52, ROM 38, or RAM 40. These programs include a server operating system 60, one or more application programs 62, other program modules 64, and program data 66. The operating system 60 is preferably a multitasking operating system that allows simultaneous execution of multiple application programs 62. The operating system employs a graphical user interface windowing environment that presents the applications or documents in specially delineated areas of the display screen called "windows." One preferred operating system is a Windows brand operating system sold by Microsoft Corporation, such as Windows 95, Windows CE, Windows NT or other derivative versions of Windows. It is noted, however, that other operating systems may be employed.

A user may enter commands and information into the server 22 through input devices such as a keyboard 68 and a mouse 70. Other input devices (not shown) may include a microphone, joystick, game pad, satellite dish, scanner, or the like. These and other input devices are connected to the processing unit 32 through a serial port interface 72 that is coupled to the system bus 36, but may alternatively be connected by other interfaces, such as a parallel port, game port, or a universal serial bus (USB).

A monitor 74 or other type of display device is also connected to the system bus 36 via an interface, such as a video adapter 76. In addition to the monitor, personal computers typically include other peripheral output devices (not shown) such as speakers and printers.

The client computer 24 has a network interface or adapter 78, a modem 80, or other means for establishing communications over a network 82 (e.g., LAN, Internet, etc.). The modem 80, which may be internal or external, is connected to the system bus 36 via the serial port interface 72.

Although not shown, the client 24 may also be implemented as a broadcast-enabled computer, which includes a digital broadcast receiver (e.g., satellite dish receiver, RF receiver, microwave receiver, etc.) and a tuner which tunes to appropriate frequencies of the broadcast network. One example implementation of a broadcast-enabled PC is described in a co-pending U.S. patent application Ser. No. 08/653,663, filed Jan. 29, 1996, which is a continuation of U.S. patent application Ser. No. 08/503,055, entitled "Broadcast-Enabled Personal Computer," filed Jul. 17, 1995, which is now abandoned. These applications were filed in the names of Gabe L. Newell, Dan Newell, Steven J. Fluegel, David S. Byrne, Whitney McCleary, James O. Robarts, Brian K. Moran; William B. McCormick, T. K. Backman, Kenneth J. Birdwell, Joseph S. Robinson, Alonzo Gariepy, Marc W. Whitman, and Larry Brader. This application is assigned to Microsoft Corporation, and is incorporated herein by reference.

Client-Based System

An aspect of this invention concerns a client-based system, implemented at each of the clients 24(1)–24(N), which improves gathering and organizing of the Web content 28. For purposes of continuing discussion, the client-based system is described in the context of being incorporated into a Web browser, such as the Internet Explorer browser available from Microsoft Corporation. FIG. 2 shows a Web browser 90 implemented as a separate application 62 or integrated into an operating system 60. However, it is noted that aspects of this invention can be implemented apart from a Web browser.

Figure 3:
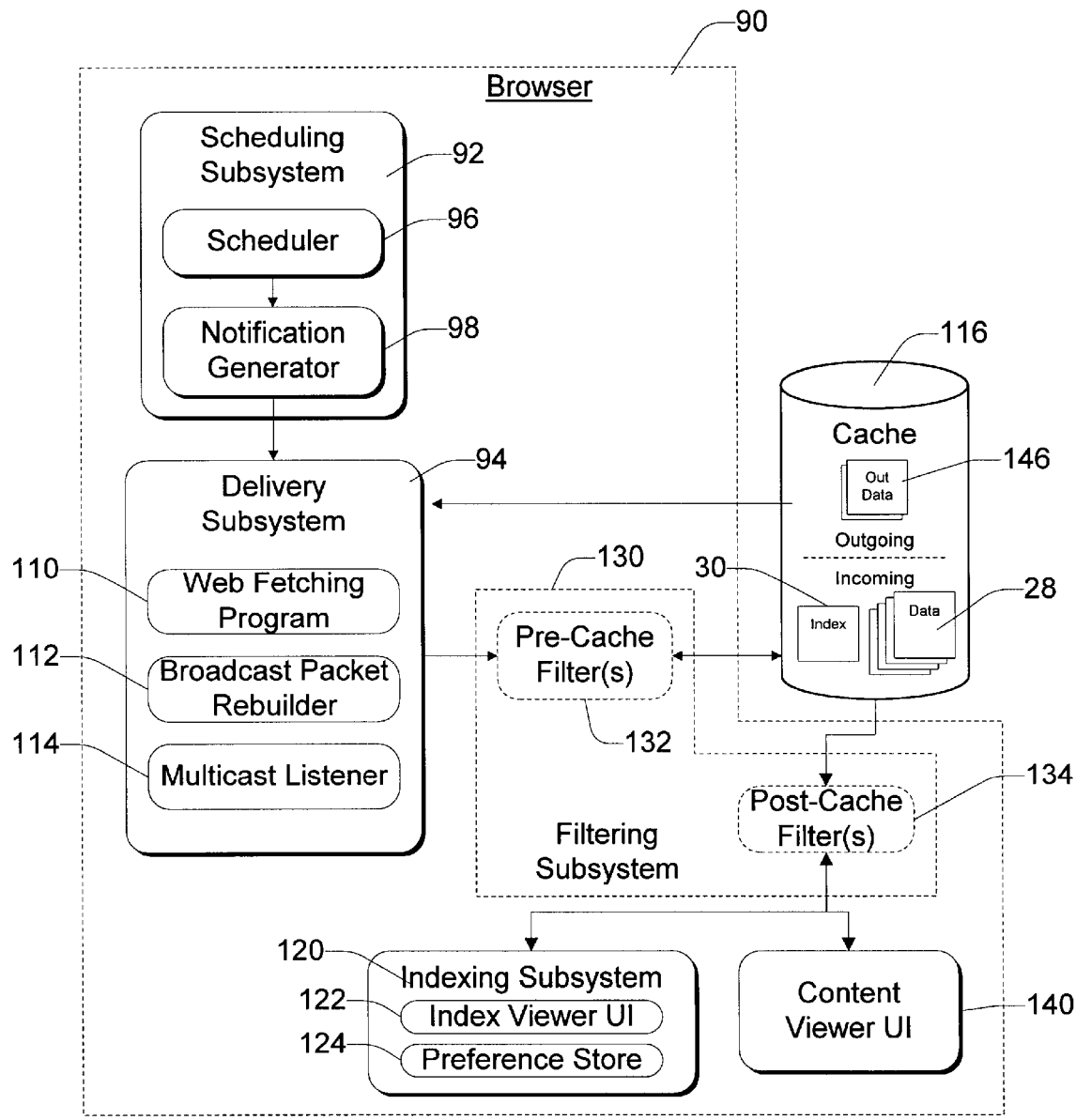
FIG. 3 is a block diagram of a client-based system for obtaining and caching Web content.

FIG. 3 shows the Web browser 90 in more detail. It includes a scheduling subsystem 92 to schedule a time to gather the Web content from one or more servers. It also includes a delivery subsystem 94, which is responsive to the scheduling subsystem 92, to obtain the Web content at the scheduled time.

The scheduling subsystem 92 has a scheduler module 96 and a notification generator module 98. The scheduler 96 consists of software code that manages when the delivery subsystem 94 is to run at a later time. The scheduler 96 thus sets the time event when certain Web content is to be collected. This may be a one-time event, a periodic event, or even an event whose occurrence is based on some degree of randomness.

Figure 4:
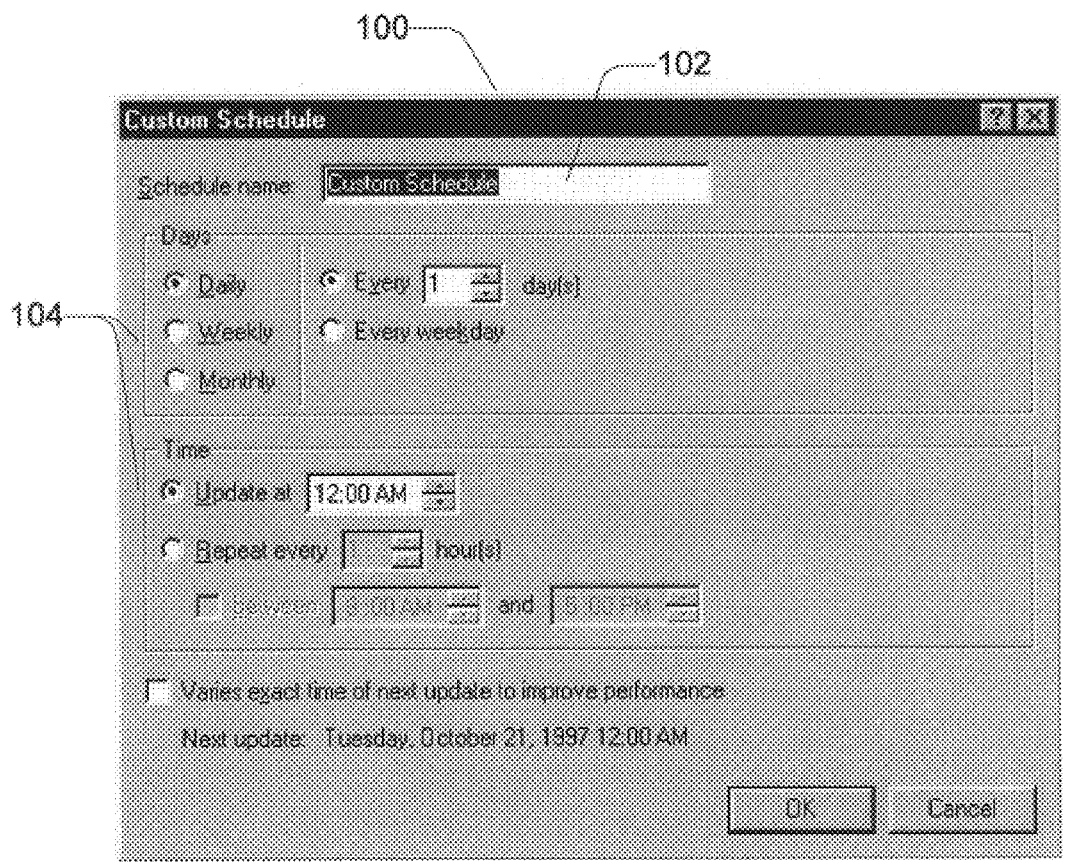
FIG. 4 is a diagrammatic illustration of a graphical user interface used to schedule when to obtain Web content.

The scheduler 96 supports a graphical user interface (UI) that enables a user to schedule such time events. FIG. 4 shows an example of a scheduling UI 100 that allows the user to specify when the browser should collect content from the Internet. The scheduling UI 100 has a field 102 that permits the user to define and name different schedules. The UI 100 also has multiple parameters 104 that the user can elect to establish various collection times.

In some cases, the user may wish to schedule the gathering of Web content at predictably low traffic times, such as at midnight or early morning hours. The user enters these constraints in the "Time" field of the schedule UI 100, as shown. The ability to coordinate delivery of content at off-hours helps alleviate network congestion and the burden on servers.

With reference again to FIG. 3, when the scheduled time arrives, the scheduler 96 informs the notification generator 98 to generate an event notification. The event notification contains sufficient information to configure, or obtain configuration information, for the delivery subsystem 94 to begin retrieval of the index and content. The event notification might contain one or more of the following types of information:

a channel reference
   instructions telling the delivery subsystem which mechanism to use to obtain the data (e.g., fetching, broadcast, multicast)
   one or more URLs
   a multicast address;
   a wireless frequency (radio, TV, etc.)

The delivery subsystem 94 provides the means for obtaining the index and Web content. The delivery subsystem 94 supports one or more different mechanisms to retrieve the information. In the illustrated implementation, the delivery subsystem 94 includes a Web fetching program 110, a broadcast packet rebuilder 112, and a multicast listener 114.

The Web fetching program 110 enables the basic functionality of going out on the Web and getting the desired content. The Web fetching program 110 uses URLs to locate the index and Web content, and downloads the found information.

The broadcast packet rebuilder 112 is used to reassemble Web content from packets that are broadcast over a broadcast medium. In the case where data is bundled and broadcast over a broadcast medium (e.g., radio, microwave, TV, etc.), the client is equipped with a broadcast receiver to receive the packets. The broadcast receiver routes the packets to the packet rebuilder 112, which reconstructs the data from the packets.

The multicast listener 114 is a program that tunes to designated multicast addresses on the network to receive messages.

When the delivery subsystem 94 retrieves the index 30 and Web content 28, it stores them in a local cache 116. The cache 116 is implemented in the hard disk drive 44 of the client computer 24, to provide persistent storage of the data. It is noted, however, that other storage means may be used to implement the cache 116, such as RAM 40 and magnetic disk drive 46.

The delivery subsystem 94 stores the Web content 28 according to a corresponding unique identifier. As one example, the Web content 28 is stored according to URLs. In this manner, the client browser can access locally cached copies of the Web content using the same URLs that would be used to retrieve the same content from remote servers.

The browser 90 also has a content indexing subsystem 120 to retrieve the index from the cache 116 and present the index to a user through a user interface 122. The index lists the available Web content that is stored in the cache, and enables the user to select or reject certain types of content.

Figure 5:
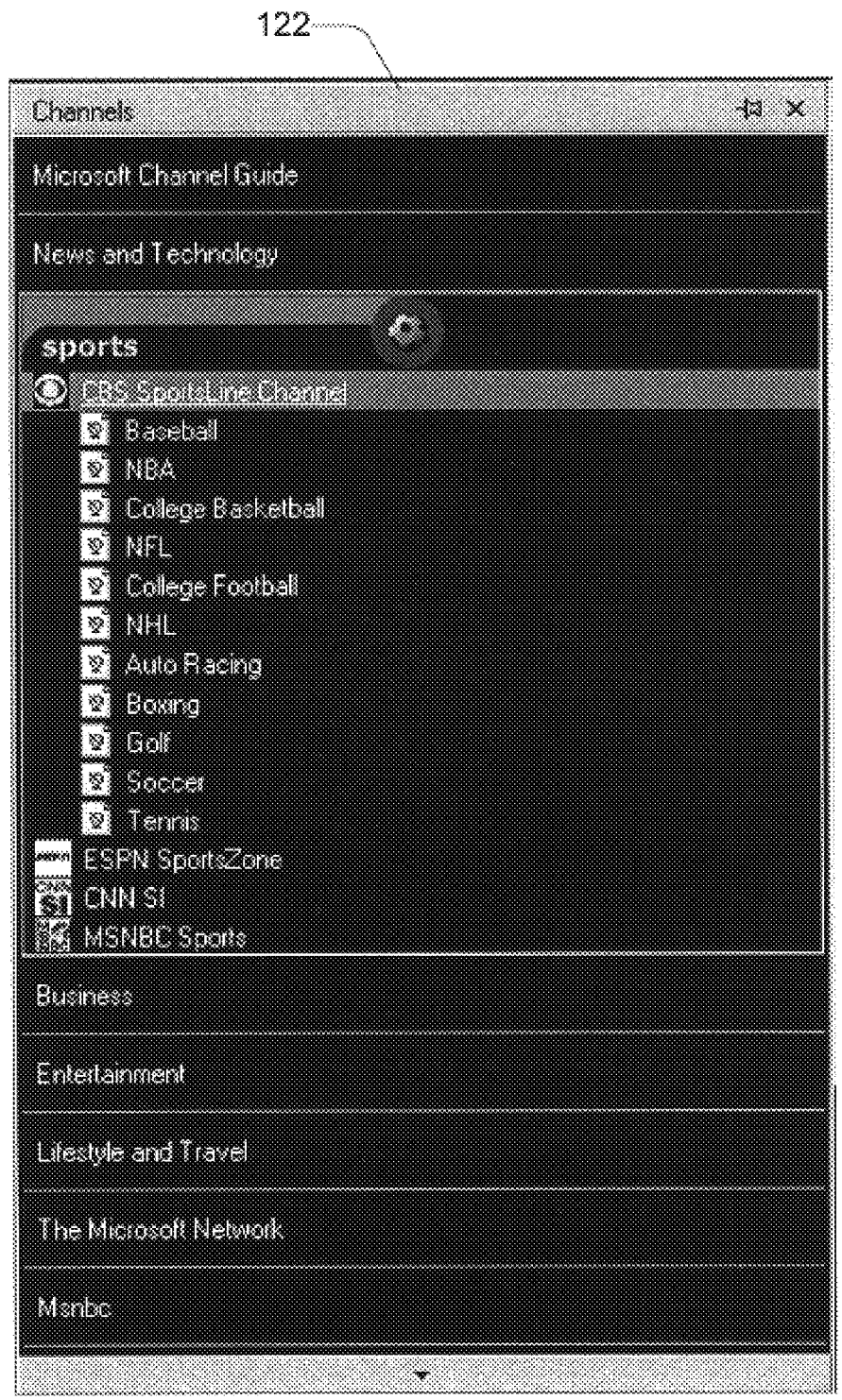
FIG. 5 is a diagrammatic illustration of a graphical user interface used to present an index of the Web content to a user.

FIG. 5 shows an example of an index viewer UI 122, which presents the Web content in a hierarchical organization. In this example, the index viewer UI 122 is a "pane" of a larger graphical user interface window, as is shown more clearly in FIG. 6.

The index UI 122 presents general categories, such as "News and Technology", "Sports", "Business", "Entertainment", "Lifestyle and Travel", "The Microsoft Network", and "MSNBC". There is also a category that contains a "Channel Guide", which provides information on the various channels available to the user. The user can elect certain channels and content by appropriately marking them in the index viewer UI 122.

The indexing subsystem 120 stores the user's preferences in a preference store 124 (which may be physically implemented in the cache 116 or other memory of the client computer). The browser 90 uses the user preferences to collect any additional Web content that is not locally stored in the cache 116. Additionally, the preferences are used to create filters that remove unwanted Web content before it is presented to the user.

The browser 90 has a filtering subsystem 130 that creates and maintains one or more personalized filters 132 and 134. The filtering subsystem 130 collects the user's preferences from the preference store 124 and constructs filters 132 and 134 based on the preferences. The filters scan the index 30 or Web content 28 and identify matches between the user's preferences and information stored in the index 30 or Web content 28. Index items or content data that do not match the user's preferences are discarded.

One type of filter is a "pre-cache" filter that filters incoming information as it is received from servers and prior to storage on the cache 116. Filter 132 is an example of a pre-cache filter. With the incoming filter 132, unwanted index items or Web content is rejected before it is stored locally.

Another type of filter is a "post-cache" filter that filters the index 30 and Web content 28 stored on the cache 116 prior to presenting it to the user. Filter 134 is an example of a post-cache filter.

The filtering subsystem 130 can be configured to filter on language types. For instance, the user might choose to view only content presented in a particular language, such as English or Spanish. Some Web sites contain multi-language documents and links to other multi-language data. With the language filter activated, any Web content in a language other than the selected language is rejected.

The browser 90 also has a content viewer UI 140 that presents the Web content to the user. The content viewer UI 140 is preferably the same windowing UI employed during normal browser operation.

Figure 6:
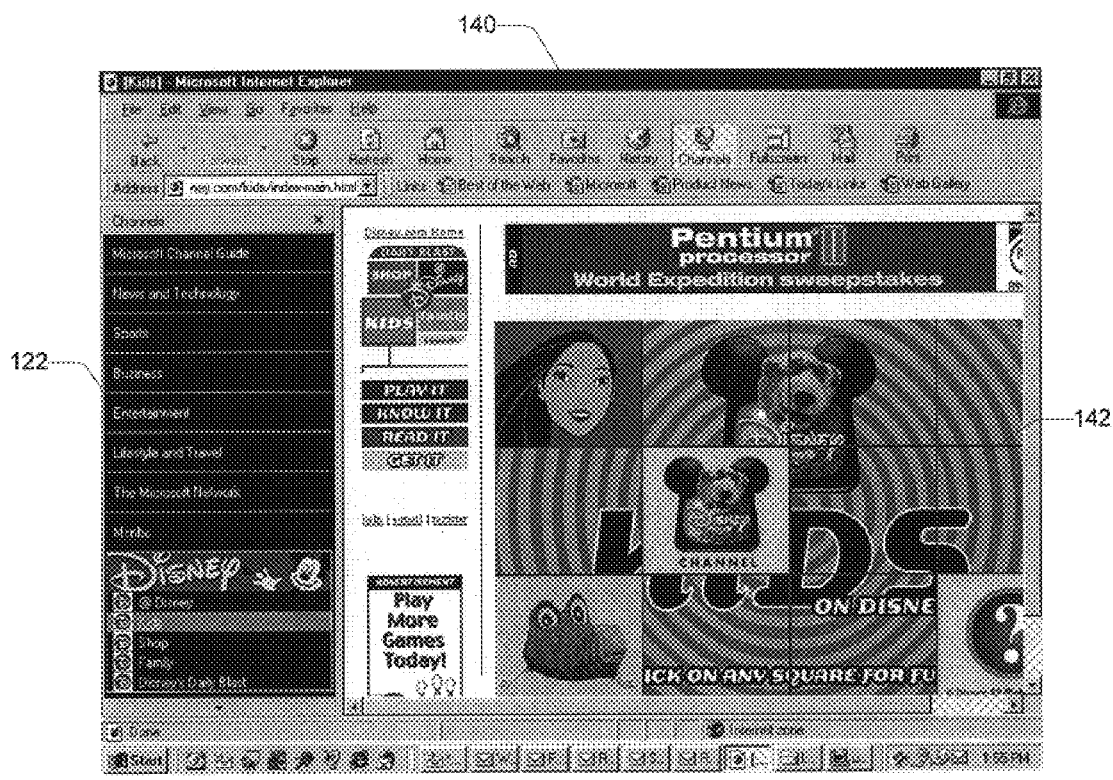
FIG. 6 is a diagrammatic illustration of a graphical user interface used to present the Web content to the user.

FIG. 6 shows an example of the content viewer UI 140, which presents the Web content to the user. In the example of FIG. 6, the content viewer UI 140 is embodied in the Internet Explorer browser, with the familiar menu, toolbar, and task bar.

The viewer UI 140 includes a presentation space 142 that depicts the Web content. In this example, the content is from a Disney channel, as indicated by the channel pane 122 adjacent the content space 142.

Exemplary Scenario

Figure 7:
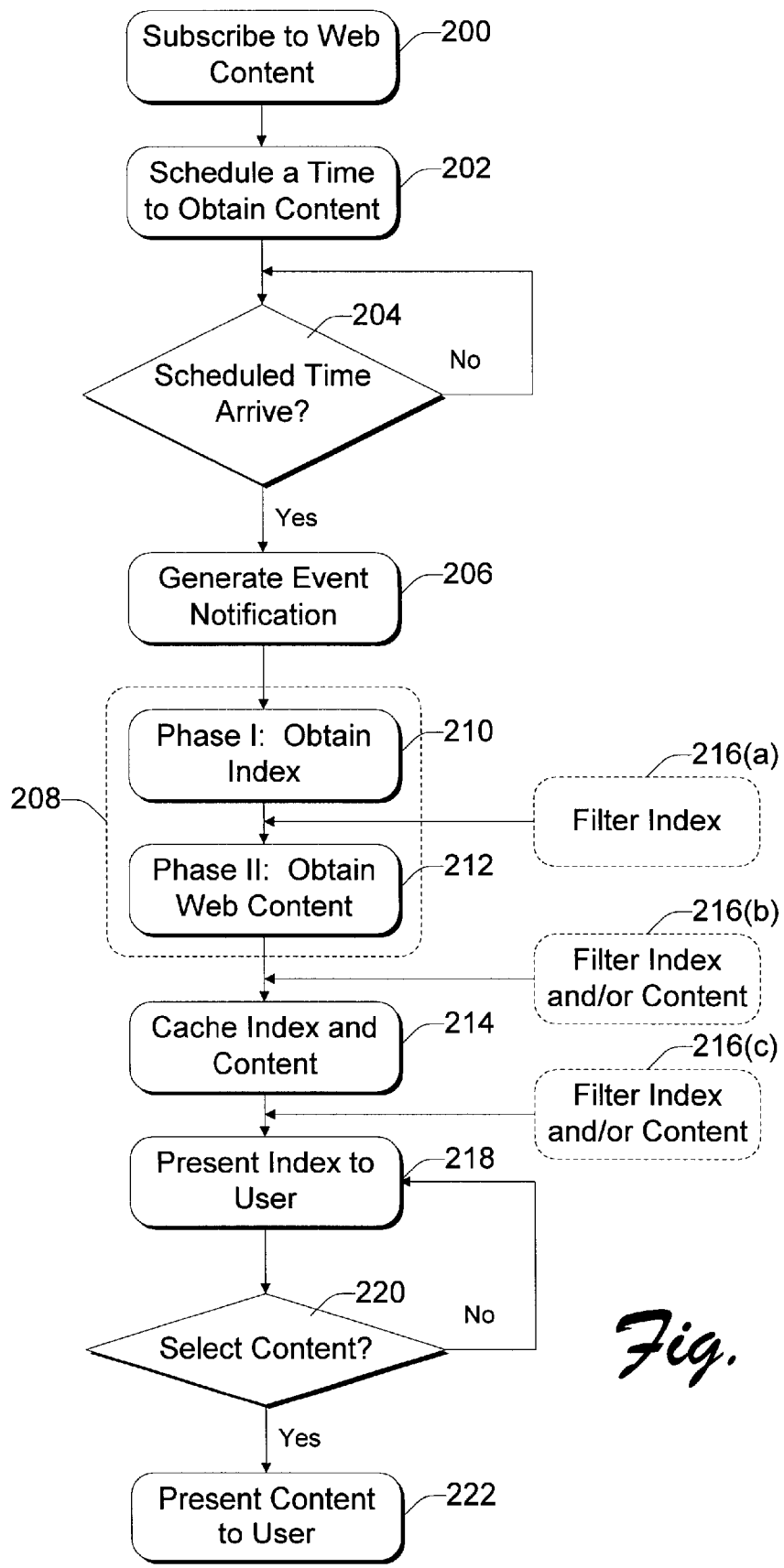
FIG. 7 is a flow diagram in a client-side process for subscribing to Web content, scheduling its delivery, and presenting it to the user.

FIG. 7 shows an example process enabled by the client-based system described above. At step 200, a user indicates, directly through a user interface or indirectly as a byproduct of some other action, that he/she wants to subscribe to some type of Web content. The subscription process involves downloading information, typically in the form of HTML forms, from the host Web site and invoking a Registration Wizard to step the user through the subscription forms. The user enters the requested information and the completed forms are sent back to the Web site.

The host site provides a schedule for its Web content. If the content is to be broadcast or multicast, the schedule indicates the times and the frequency or address at which the Web content will be made available. The schedule from the host site is stored as part of the index 30 in the cache.

At step 202, the scheduling subsystem 92 schedules retrieval of desired Web content at certain times. The times might be those specified by the user (e.g., off-hour retrieval times) or those specified as the broadcast or multicast times. The scheduler 96 then tracks when the schedule times arrive (step 204).

When a schedule time arrives (i.e., the "yes" branch from step 204), the notification generator 98 generates a notification event (step 206). This notification event is passed to the delivery subsystem 94, which invokes the appropriate delivery module to begin the process 208 of obtaining the information.

The delivery process 208 involves two phases. The first phase is to retrieve the index 30 (step 210). The second phase is to retrieve the Web content 28 (step 212). The browser stores the index and Web content in the cache 116 (step 214).

The filtering subsystem 130 may be invoked to filter the index and/or content at different phases. One or more filters might be applied to the index prior to determining what content to pull from the Internet (step 216(*a*)). In addition, one or more filters might be applied after both the index and Web content are retrieved, but prior to caching (step 216(*b*)). As a third alternative, one or more filters might be applied to the index and/or content after caching but prior to presentation to the user (step 216(*c*)).

At step 218, the index is retrieved from the cache and presented to the user in the index viewer UI 122. The index viewer UI 122 displays one or more indices that are associated with the information to which the user has subscribed. Once the user has found some information they deem valuable, the user selects the Web content (i.e., the "yes" branch from step 220). The selected Web content is then presented to the user in the content viewer UI 140 (step 222).

Aggregation/Disaggregation

The browser 90 enables the user to construct custom or personal channels by aggregating content from multiple channels into a single custom channel. The user selects a set of channels from the channel pane 122 and indicates the preferred Web content within each channel. The browser takes the user's input and constructs a set of filtration rules based on the user's selections and preferences. The browser then creates a new channel that presents the Web content from the set of channels that survives the filters.

As an example, suppose the user wants a personal channel that contains only basketball-related content. The user selects a set of channels that might carry basketball information, such as ESPN, CBS, CNN, and the like. Within each channel, the user can mark the sub-channel for basketball content or apply a filter for specific items in that channel to be disaggregated and then reaggregated. In FIG. 5, for instance, the user might check CBS SporstLine Channel, and the sub-channels "NBA" and "College Basketball". In the case of the filter, basketball-related content is automatically identified by the browser based on keywords, tags, or other means for identification that the content provider might include with the content. These preferences are stored in the preference store 124.

The filtering subsystem 130 creates one or more filters that identify the basketball information from each of the selected channels. The new channel then references the identified basketball information by maintaining, for example, the URL to the basketball information as it is stored in the cache 116.

The channel pane UI 122 lists the personal channel as the "Basketball" channel. It may also identify sub-channels such as EPSN highlights, CBS Game of the Week, and so forth. When the user clicks on the Basketball channel or sub-channel, the browser retrieves the basketball content and presents it in the viewer UI 140.

In addition to aggregating content from several channels into a custom channel, the browser 90 allows the user to disaggregate content from a single channel. Disaggregation might be used to change the offerings of a channel, or to modify the channels' hierarchical categorization of content, or to create multiple channels from a single channel. This all occurs at the client, so the server-side organization is not altered.

As an example of disaggregation, suppose a channel for offers news and sports as a sub-channel to the news. The user can choose to delete the news channel, while preserving the sports channel. Alternatively, the user might move the sports channel to a different level, such as equal to the news so that it is no longer a sub-channel to the news. The user might further choose to disaggregate the news and sports into two separate channels.

Offline Submission

The browser 90 allows a user to work offline from the server in a manner that feels familiar to working online. After the Web content 28 is downloaded and stored in the cache 116, the client can disconnect from the server or network. Despite being disconnected, the user can continue to search and find the Web content using the locally cached data. The Web content can be, for example, in the form of Web pages with internal hyperlinks to other pages in the cache. Accordingly, the user can browse through the Web content in the cache 116, while offline, in the same manner that he/she browses the content while online.

When the user performs operations that involve submitting data to a remote server, the browser temporarily accumulates the outgoing data 146 in the cache 116 for submission at a later time. For example, during the course of browsing, the user may stumble onto a service that he/she would like to join. The user fills out the form, such as an HTML form, and clicks a "submit" button to send the completed form back to the originating Web site. To the user, the clicking action appears to send the form back to the server, as the form leaves the screen as if it were sent.

Since the client is offline, the HTML form is not really sent to the server. Instead, it is kept in the cache 116 until a later online session. When the client subsequently reconnects to the network during the next online session, all of the accumulated data 146 that is destined for one or more remote servers (i.e., requests, forms, etc.) are sent in a batch to the appropriate servers.

Webcast Center Implementation

Figure 8:
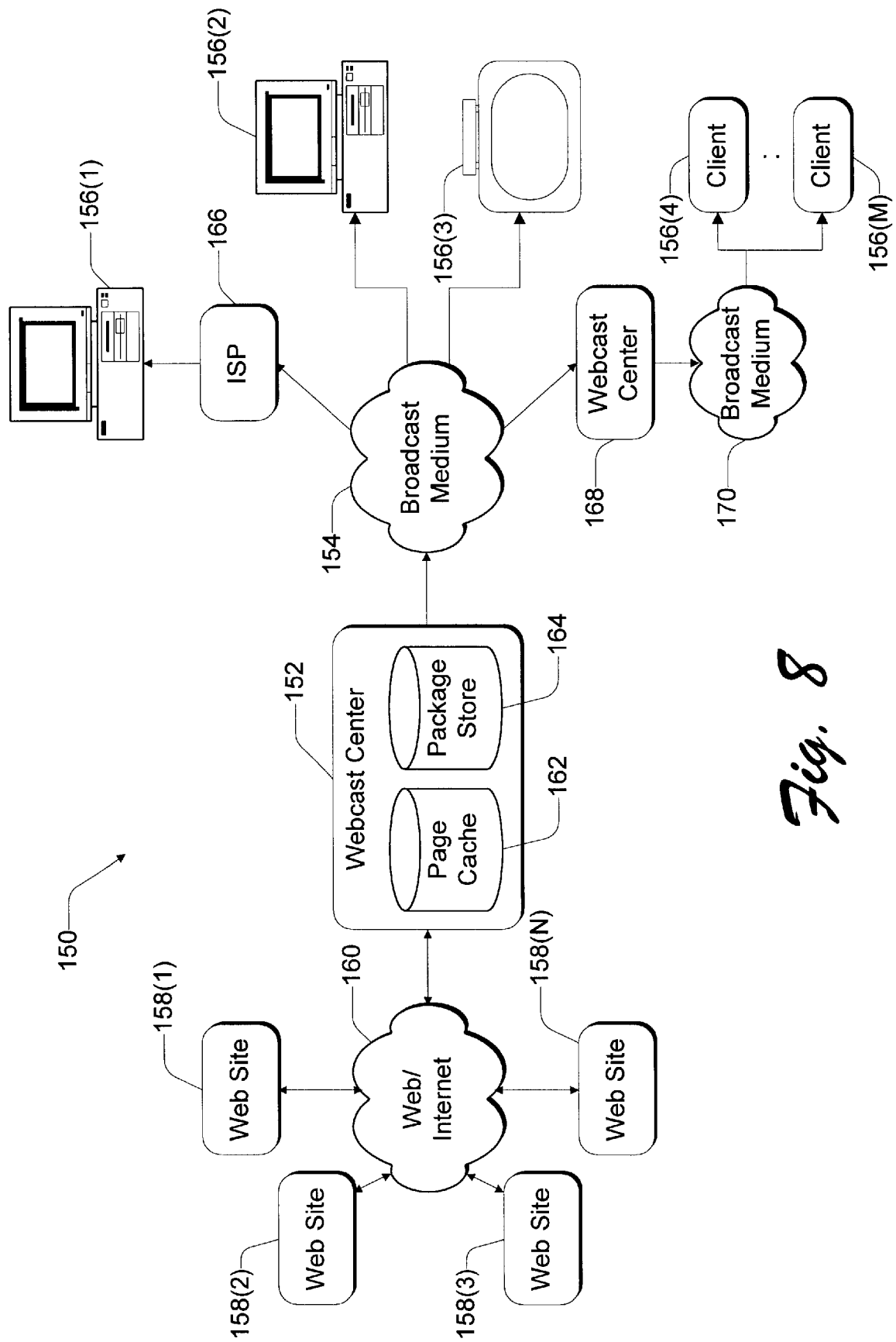
FIG. 8 is a diagrammatic illustration of a webcast system.

The client-based system described above is also well suited for use in a webcast system. FIG. 8 shows a webcast system 150 for delivering Web content from a webcast center 152 over a broadcast medium 154 to multiple clients 156(1)–156(M). The webcast center 152 gathers Web content from the World Wide Web by visiting web sites 158(1)

–158(N) via the Internet 160 and fetching content from those sites. The webcast center 152 collects Web pages from the Internet's World Wide Web 160 and stores them in a page cache 162. A system administrator sets a schedule that establishes which sites are visited by the webcast center 152, the time and frequency of the visits, and the type of content collected.

Apart from the gathering process, the webcast center 152 retrieves the pages from the page cache 162, bundles them into composite package files, and stores them in a package store 164. The package store 164 is preferably a separate database than the page cache 162. The webcast center 152 fetches the package files from the package store 164, segments the package files into individual packages (or packets), and transmits the packages over the broadcast medium 154.

The broadcast medium 154 is a unidirectional network in which packages are delivered from the webcast center 152 to the clients 156(1)–156(M) without requiring return communication from the clients. The broadcast medium 154 can be characterized as a shared, highly asymmetrical, network resource with a limited, if not completely absent, low speed return path that does not need to be active to receive broadcast transmissions. The broadcast medium 154 may comprise the entire distribution network between the webcast center and clients, or it may be a single link in a larger distribution network.

The broadcast medium 154 may be implemented in a variety of ways. The broadcast medium 154 might be implemented, for example, as a wireless network configured for one-way transmission (i.e., satellite, radio, microwave, etc.). The broadcast medium 154 might also be configured as a network that supports two-way communication (i.e., Internet, LAN (local area network), and WAN (wide area network)), but can be used for unidirectional multicasting from the webcast center to the clients.

The clients 156(1)–156(M) represent various types of constructions. The clients can be implemented as essentially any type of computing device that can receive and reconstruct data packages, and render the packages on a display. As one possible implementation, the client may be constructed as a desktop computer, as represented clients 156(1) and 156(2), that are specially configured with software/ hardware components described below with respect to FIG. 2. Client 156(1) receives broadcast Web content from the broadcast medium 154 via an Independent Service Provider (ISP) 166, rather than receiving the broadcasts directly. On the other hand, client 156(2) is a broadcast-enabled personal computer that is capable of receiving the broadcast packets directly.

Another implementation of a client is a Web-enabled television, as represented by client 156(3), which has a set-top box or internal computing unit that permits receipt and rendering of Web content. In addition to desktop computers and Web-enabled TVs, other possible clients include workstations, laptop computers, palmtop computers, network computers, and the like.

Another distribution entity may act as a "client" to the webcast center 152. As shown in FIG. 8, the regional Independent Service Provider (ISP) 166 might be a subscriber to the broadcast transmissions received over the broadcast medium 154 from the webcast center 152. The ISP 166 stores the webcast content and distributes it to its own clientele, such as client 156(1), using conventional distribution techniques.

As another example of an intermediary distribution entity, a secondary webcast center 168 may function as a "client" to the primary webcast center 152. In addition to its own independent gathering process, the secondary webcast center 168 also receives and re-broadcasts the Web content received from the primary webcast center 152 to a set of clients 156(4)–156(M) over a broadcast medium 170. One implementation of this dual webcast center architecture is that the primary webcast center 152 is a primary head end that distributes nationally or globally via satellites, and the secondary webcast center 168 is a regional distributor that distributes the Web content via RF (radio frequency) or microwave transmission.

A more detailed discussion of this webcast system 150 is provided in a co-pending U.S. patent application Ser. No. 08/958,609, entitled "System and Method for Delivering Web Content over a Broadcast Medium", which was filed Oct. 27, 1997, in the names of Anne Wright, Randy Sargent, Carl Witty, Brian Moran, and David Feinleib. This co-pending application is assigned to Microsoft Corporation and is incorporated by reference.

Server-Side Filtering Based on Client Preferences

As discussed above, the browser 90 enables the user to define certain preference criteria that is used to create filters. In the above implementation, the filters 132, 134 reside at the client. In another implementation, these user preferences can be used to create filters on the server side.

Figure 9:
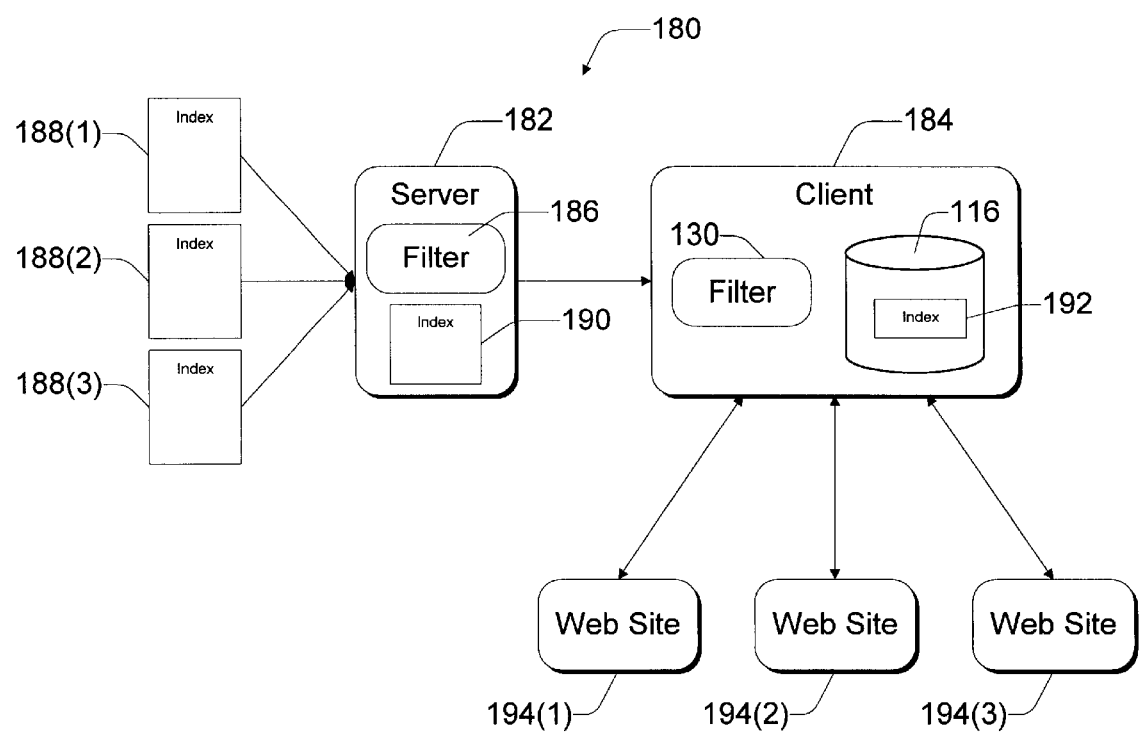
FIG. 9 is a diagrammatic illustration of a client-server system in which the server implements filters constructed according to client preferences.

FIG. 9 shows a client-server system 180 having a server 182 and a client 184. The client 184 is constructed as described above, having both a cache 116 and a local filtering subsystem 130. The client 184 establishes an account or some form of registration with the server 182. The client 184 then submits the user's preferences to the server 182, which creates one or more filters 186 based on the user's preferences. These filters 186 are maintained at the server 182 under the client's account.

As the server receives various indexes 188(1)–188(3) of available Web content, the server 182 filters the indexes using the server-side filters 186 to create a customized index 190. The server 182 occasionally downloads the customized index 190 to the client 184.

At that point, the client 184 may additionally apply its local filters 130 to further condense the customized index to yet a smaller index 192. It is this doubly-filtered index 192 that is presented to the user. Depending on the user's selection, the client obtains the Web content either from the local cache, if available, or directly from the Web sites 194(1)–194(3) themselves. Notice that the server supplying the filtered index need not be the actual Web sites that hold the information, although it can be. For instance, the client can use the condensed index 192 as a means for identifying the Web content to be pulled down to the client for the user's perusal. Once the Web content is identified, the client schedules retrieval of the content from one or more Web sites 182 and 194(1)–194(3).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. In a client-server system in which Web content is delivered from multiple servers to a client, a client-based system implemented at the client comprising:
   a scheduling subsystem to schedule times to obtain the Web content from the servers without the servers having prearranged knowledge of the times, whereupon reaching a scheduled time, the scheduling subsystem generates an event notification containing information regarding how to retrieve the Web content from a corresponding server;

a delivery subsystem, responsive to the event notification, to retrieve the Web content and an index of the Web content from the corresponding server;

a cache to store the index and the Web content obtained by the delivery system;

an indexing subsystem to retrieve the index from the cache and present the index to a user, the indexing subsystem including a user interface which enables the user to select from the index portions of the Web content stored in the cache; and a filter to condense the index according to preferences of the user.

2. A client-based system as recited in claim 1, wherein the scheduling subsystem comprises:

a scheduler to schedule the time to obtain the Web content; and a notification generator to generate the event notification at the scheduled time.

3. A client-based system as recited in claim 1, wherein:

the delivery subsystem comprises multiple delivery modules that utilize different distribution systems to retrieve the index and the Web content; and the event notification contains instructions dictating which of the delivery modules is to be used.

4. A client-based system as recited in claim 1, wherein the Web content is multicast to a network address, the delivery subsystem comprising a listener program to listen to the network address at the scheduled time to retrieve the Web content.

5. A client-based system as recited in claim 1, wherein the delivery subsystem comprises a fetching program to access the server and retrieve the Web content from the server.

6. A client-based system as recited in claim 1, wherein the Web content is transmitted as a broadcast data stream over a broadcast medium from the server, the delivery subsystem being coupled to receive the broadcast data stream from a broadcast receiver and to reconstruct the Web content from the data stream.

7. A client-based system as recited in claim 1, further comprising a content user interface to present the Web content to the user.

8. A Web browser application, embodied on a computer-readable medium, comprising:

computer-executable instructions to schedule a time to obtain Web content from a server without the server having prearranged knowledge of the scheduled time;

computer-executable instructions to generate an event notification upon occurrence of a scheduled time, the event notification containing information regarding how to retrieve the Web content;

computer-executable instructions to retrieve the Web content and an index of the Web content;

computer-executable instructions to present the index to a user and to enable the user to select certain Web content identified in the index; and computer-executable instructions to filter the index according to user preferences.

9. A Web browser application as recited in claim 8, further comprising computer-executable instructions to listen to a multicast address to retrieve at least one of the index and the Web content.

10. A Web browser application as recited in claim 8, further comprising computer-executable instructions to access a remote server and retrieve at least one of the index and the Web content.

11. A system for delivering Web content over a medium, comprising:

a gathering subsystem located at a webcast center to gather Web content from sites on the Internet and to store the Web content;

a scheduling subsystem implemented at a client remote from the webcast center to schedule a time for the client to retrieve the Web content from the webcast server;

a delivery subsystem implemented at the client and responsive to the scheduling subsystem to obtain the Web content from the webcast center at the time set by the scheduling subsystem;

a program implemented at the client to cache a user's preferences regarding types of the Web content;

an indexing subsystem at the client to obtain an index of the Web content and present the index to a user, the indexing subsystem including a user interface which enables the user to select certain Web content identified in the index; and a filter to filter the index according to the user's preferences.

12. A system as recited in claim 11, further comprising:

a multicast transmitter at the webcast center to multicast the Web content to a multicast address; and the delivery subsystem comprising a listener program to listen to the multicast address to retrieve the Web content.

13. A system as recited in claim 11, wherein the delivery subsystem comprises means for accessing the server and retrieving the Web content from the server.

14. A system as recited in claim 11, further comprising:

a broadcast transmitter to broadcast the Web content from the webcast center as a broadcast data stream over a broadcast medium; and the delivery subsystem being coupled to receive the broadcast data stream from a broadcast receiver and to reconstruct the Web content from the data stream.

15. A system as recited in claim 11, wherein the filter is implemented at the webcast center.

16. A system as recited in claim 11, wherein the filter is implemented at the server.

17. A system as recited in claim 11, wherein the webcast center maintains the index of the Web content and wherein the indexing subsystem obtains the index from the webcast center.

18. A system as recited in claim 11, further comprising:

a cache implemented at the client;

a data submission subsystem implemented at the client to accumulate data, which is destined for the server for server-side processing, within the cache while the client is offline from the webcast center; and the data submission subsystem submitting the data accumulated in the cache to the webcast center during an online session between the client and the server.

19. In a client-server system in which Web content is delivered from a server to a client, a computer-implemented method implemented at the client comprising the following steps:

scheduling a time to obtain the Web content from the server without the server having prearranged knowledge of the scheduled time;

listening to a multicast address to retrieve the Web content from the server at the scheduled time;

locally caching the Web content obtained from the server;

obtaining an index of the Web content from the server; and filtering the index according to user preferences.

20. A computer-implemented method as recited in claim 11, further comprising the step of caching the Web content according to a unique identification.

21. A computer-implemented method as recited in claim 11, further comprising the step of caching the Web content according to a corresponding universal resource locator.

22. A computer-implemented method as recited in claim 19, further comprising the following steps:

presenting the index to a user; and enabling a user to select items in the index as an indication of preferred Web content.

23. A computer-implemented method as recited in claim 11, further comprising the following steps:

caching data to be submitted to the server when the client is offline from the server; and submitting the cached data to the server during an online session in which the client is actively connected to the server.

24. A computer-implemented method as recited in claim 11, further comprising the following steps:

enabling a user to select Web content obtained from different channels; and aggregating the Web content into a single channel for presentation to the user.

25. A computer-readable medium having computer-executable instructions for performing the steps as recited in claim 11.

26. A browser application, embodied on a computer-readable medium, having computer-executable instructions for performing the steps as recited in claim 11.

* * * * *

UNITED STATES PATENT AND TRADEMARK OFFICE
CERTIFICATE OF CORRECTION

PATENT NO. : 6,594,682 B2
DATED : July 15, 2003
INVENTOR(S) : Peterson et al.

It is certified that error appears in the above-identified patent and that said Letters Patent is hereby corrected as shown below:

Column 17,
Lines 8, 12 and 20, replace "11," with -- 19, --.

Column 18,
Line 7, replace "11," with -- 19, --.
Lines 15 and 18, replace "11." with -- 19. --.

Signed and Sealed this

Fourth Day of May, 2004

JON W. DUDAS
*Acting Director of the United States Patent and Trademark Office*